United States Patent [19]
Chundury et al.

[11] Patent Number: 5,194,482
[45] Date of Patent: Mar. 16, 1993

[54] FLAME RETARDANT RESIN COMPOSITION CONTAINING STYRENIC POLYMERS

[75] Inventors: Deenadayalu Chundury, North Royalton; Neil A. Burditt, Shaker Heights, both of Ohio

[73] Assignee: Ferro Corporation, Cleveland, Ohio

[21] Appl. No.: 741,199

[22] Filed: Jul. 30, 1991

Related U.S. Application Data

[63] Continuation of Ser. No. 571,938, Aug. 23, 1990, abandoned.

[51] Int. Cl.$^5$ .............................................. C08K 3/10
[52] U.S. Cl. .................................... 524/412; 524/410
[58] Field of Search ............. 524/94, 410, 226, 412, 524/464, 519; 525/99, 209

[56] References Cited

U.S. PATENT DOCUMENTS

| | | | |
|---|---|---|---|
| 4,098,761 | 7/1978 | Maul et al. | 524/412 |
| 4,136,135 | 1/1979 | Lee | 524/412 |
| 4,154,776 | 5/1979 | Bracke et al. | 525/99 |
| 4,267,284 | 5/1981 | Kitchen | 525/99 |
| 4,353,820 | 10/1982 | Lindvay | 524/409 |
| 4,374,220 | 2/1983 | Sonnenberg | 524/412 |
| 4,386,188 | 5/1983 | Grancio et al. | 525/99 |
| 4,394,484 | 7/1983 | Jenkner et al. | 525/209 |
| 4,735,983 | 4/1988 | Takaku et al. | 524/412 |
| 4,829,118 | 5/1989 | Favstritsky et al. | 524/412 |
| 4,839,410 | 6/1989 | Atomori et al. | 524/281 |
| 4,945,018 | 7/1990 | Abolins et al. | 524/412 |
| 5,112,896 | 5/1992 | Dever et al. | 524/412 |
| 5,112,898 | 5/1992 | Dever et al. | 524/412 |

FOREIGN PATENT DOCUMENTS

| | | |
|---|---|---|
| 8705615 | 9/1987 | European Pat. Off. |
| 262615 | 4/1988 | European Pat. Off. |
| 8803542 | 5/1988 | World Int. Prop. O. |

*Primary Examiner*—Kriellion S. Morgan
*Attorney, Agent, or Firm*—Hudak & Shunk, Co., L.P.A.

[57] ABSTRACT

A flame retardant styrene composition that has improved impact strength is provided while maintaining heat deflection temperature and flexural modulus. The impact strength is improved through the use of a styrene butadiene block copolymer compatibilizing agent. In a preferred embodiment, the use of a brominated diphenyl oxide as a flame retardant is avoided.

13 Claims, No Drawings

FLAME RETARDANT RESIN COMPOSITION CONTAINING STYRENIC POLYMERS

This application is a continuation of application Ser. No. 07/571,938, filed on Aug. 23, 1990, now abandoned, by Deenadayalu Chundury and Neil A. Burditt for "Improved Flame-Retardant Resin Composition Containing Styrenic Polymers."

FIELD OF THE INVENTION

The present invention generally relates to flame retardant styrene polymer compositions that have improved impact strength. The compositions additionally have flexural modulus and heat deflection properties similar to styrene polymer compositions not containing flame retardants.

BACKGROUND

Heretofore, whenever flame retardants were added to various thermoplastic polymers such as styrene resins, various physical properties were affected such as reduced impact strength. This is due to the fact that while imparting flame retardancy, the flame retardant causes embrittlement when added to produce the desired flame retardancy.

European Patent Applications 262,615 and 87/05615 to Haaf and Abolins, respectively, relate to flame retardant polyphenylene ether compositions and more specifically to compositions of a polyphenylene ether resin and a high impact polystyrene in which a post brominated polystyrene oligomer or polymer and antimony oxide are used in combination to impart better flame resistance, impact strength, and mold flow.

WIPO International Bureau 88/03542 relates to modified polyphenylene ether resins having improved flow properties and, in particular, it relates to modified polyphenylene ether resins incorporating a brominated alkenyl aromatic resin, a diester of tetrabromophthalic acid, and a flame retardant enhancer such as antimony trioxide. Flame retardant polystyrenes have various applications in injection molded products such as television cabinets, television racks, business machine housings, table-top and lap-top computers, smoke detector housings and modular furniture including hospital furniture.

The compositions of the present invention are also useful especially for making other molded articles such as medical disposal boxes for the receipt, storage, and eventual disposal of contaminated medical products; for electrical boxes and connectors, electrical materials, and the like.

While the impact properties of flame retardant polystyrene may be acceptable when the flame retardant is decabromodiphenyloxide without the use of a compatibilizer, in a preferred embodiment of the invention, the flame retardant excludes this composition and its analogs. These brominated diphenyl oxides may pyrolize to form furans which are potentially hazardous and environmentally toxic. Thus, it is preferred to use a flame retardant package of the present invention such as brominated polystyrene and to utilize the compatibilizing agent to improve the impact properties.

SUMMARY OF THE INVENTION

Generally, when flame retardancy is imparted to styrene polymeric resins, impact strength is reduced due to the fact that the polymeric resins become embrittled. In the present invention the impact strength of the flame retardant polymer is further augmented by incorporating therein a compatibilizing agent comprising a block copolymer.

Thus, the present invention relates to a flame retardant package which comprises a flame retardant, a flame retardant synergist and an compatibilizing agent. In a preferred embodiment, the flame retardant is a brominated styrene polymer such as brominated polystyrene. The compatibilizing agent is a styrene butadiene block copolymer.

DETAILED DESCRIPTION OF THE INVENTION

The present invention comprises four components: a styrene polymeric resin, a flame retardant synergist, a flame retardant, and a compatibilizing agent or property enhancer.

Alternatively, this invention can be envisioned as a two component system comprising the styrene polymer and a flame retardant package where the package comprises the flame retardant, the flame retardant synergist and the compatibilizing agent. Similarly, the blend compositions of the present invention can be blended in a one part or two part process. In the one part process, all of the ingredients are mixed in the same step although they may be metered at various points of the mastication process. In the two part process, two or more ingredients may be premixed such as the flame retardant package.

The styrene polymeric resins having utility in this invention comprises high impact polystyrene (HIPS), polystyrene, poly-$\alpha$-methylstyrene, polyvinyl naphthalene, styrene-acrylonitrile copolymer, styrene maleic anhydride copolymer, EPDM modified styrene acrylonitrile copolymer, styrene-acrylic copolymer, acrylonitrile-styrene-acrylic terpolymer, polystyrene-polyphenylene oxide blend, or acrylonitrile-butadiene-styrene graft copolymer. Of these, the preferred is high impact polystyrene. High impact polystyrene is understood in the art as a thermoplastic resin product from styrene monomer along with elastomers such as polybutadiene which ar introduced into the polystyrene matrix.

Polystyrene homopolymers, polystyrene copolymers, or terpolymers or graft copolymers and blends thereof are preferred. The above-noted styrene polymeric resins are generally commercially available and have a weight average molecular weight of from about 100,000 to about 1,000,000 and preferably from about 200,000 to about 300,000.

The amount of the various flame retardants which are utilized are generally dictated by a desirable UL (Underwriters Laboratories, Inc.) 94 flammability rating. The UL 94 test is a vertical burning test. A material having a V-0 rating allows only minimal burning and no flaming drip of a standard bar of specified thickness. The V-1 rating allows longer burn times than the V-0, but not flaming drip. The V-2 rating allows the same burn time as the V-1 and also allows flaming drip. The fail rating is given any material not meeting the V-0, V-1, or V-2 criteria. The choice of the variously rated flame-retardant polystyrene resins depends upon the end use.

Compositions having UL94 ratings from V-0 to V-2 may be useful depending on the application. It may be preferable to achieve the V-0 rating for certain applications.

The styrene polymeric resins of the present invention contain a flame retardant synergist comprising antimony oxide or sodium antimonate. Its main function is to promote the flame retardancy properties of the flame retardant. The synergist is employed in effective amounts to improve the flame retardancy within the styrenic resin. Generally, an effective amount of synergist is from about 1 to about 8 parts, preferably from about 3 to about 7 parts and most preferably from about 4 to about 6 parts by weight per 100 parts by weight of the resin components.

Various flame retardants comprising halogenated organic compounds are utilized in association with the antimony component. Examples of suitable halogenated organic compounds include brominated dipentaerithritol, tetrabromobisphenol A, ethylene-bistetrabromophthalimide, ethylenebisdibromonorbornane-dicarboximide, tetrabromobisphenol A-bis(2,3-dibromopropyl ether), octabromodiphenyl oxide, hexabromocyclododecane, hexabromodiphenoxy ethane, decabromodiphenoxy ethane, decabromodiphenyloxide, tetradecabromodiphenoxy benzene, brominated polystyrene, tetradecabromodiphenyloxide, polydibromophenylene oxide, phenoxy terminated bisphenol A carbonate oligomers containing from about 50 to about 60 percent bromine, brominated epoxy resins containing from about 30 to about 60 percent bromine, and mixtures thereof. Brominated organic compounds which are especially preferred comprise brominated polystyrene, hexabromocyclododecane, ethylene-bis-tetrabromophthalimide and ethylene dibromonorbornane-dicarboximide.

In a preferred embodiment of the invention, the flame retardant excludes brominated diphenyl oxides such as octabromodiphenyl oxide, decabromodiphenyl oxide, tetradecabromodiphenyl oxide, poly-dibromaphenylene oxide and the like. The flame retardant is thus preferably brominated polystyrene such as a high molecular weight and low molecular weight brominated polystyrene. The high molecular weight brominated polystyrene is generally understood to have a molecular weight of from about 100,000 to about 400,000, while the low molecular weight brominated polystyrene is generally understood to have a molecular weight of from about 1,000 to about 20,000. At the present time those brominated polystyrenes having a molecular weight between 20,000 and could fall into either category and therefore should be understood to be encompassed in the present invention.

Also incorporated into the styrene resin is a compatibilizing agent which functions to improve the impact properties of the blend. Further, this compatibilizing agent could be termed a property enhancer. The compatibilizing agent is preferably a copolymer of styrene and butadiene or isoprene. This copolymer is preferably a block copolymer having a diblock, triblock, multi-block or a star radial composition. The block copolymer is a styrene-butadiene copolymer having generally a butadiene content of from about 20 percent to about 80 percent and a styrene content of from about 80 percent to about 20 percent. Preferably the butadiene is from 35 to 65 percent, most preferably it is from 40 to 60 percent with the styrene comprising the remainder.

The compatibilizers are commercially available having various styrene-butadiene levels. Available from Shell Oil Co. is a material having about 75 percent butadiene and about 25 percent styrene under the name Kraton ® D. Other impact modifiers include partially hydrogenated styrene butadiene or isoprene block copolymers (for example, Kraton ® G) and functionalized block copolymers (for example, Kraton ® GF 1901). Both Fina and Firestone market a 50 percent butadiene and 50 percent styrene under the name Finaprene ® and Stereon ®, respectively. Phillips Petroleum markets a material having about 25 percent butadiene and 75 percent styrene under the name K-resin. The intermediate block copolymer employed in this invention has a butadiene-styrene content of about 50:50 and gave unexpected results. The terms diblock, triblock, multiblock or star radial copolymers are understood in the art as is illustrated in the *Encyclopedia of Polymer Science and Engineering*. Volume 2, 1985, pp. 325–326, published by John Wiley & Sons, New York, incorporated herein by reference. In particular, the multiblock copolymers are understood to have an $A_k$-$B_m$-$A_k$-$B_l$-$A_k$-$B_l$ type of structure. Stereon is an example of such a product. Further, this product has a desirable ratio of styrene to butadiene in the range of around 40/60 and a desirable weight average molecular weight of from about 50,000 to 100,000, and more particularly 75,000 to 95,000. The amount of compatibilizing agent generally ranges from about 1 to about 18 and preferably from about 4 to about 15 and most preferably from about 6 to about 12 for every 100 parts by weight of the styrene resin.

While obtaining a polymer composition meeting UL 94 V-0 criteria, the polymer composition also has an acceptable impact strength. Typically, the compatibilizing agent imparts a notched Izod impact strength improvement of at least about 10 percent, preferably about 20 percent, and most preferably >30 percent over a comparable flame retardant polymer composition not containing the compatibilizing agent.

These compositions have improved Gardner and Izod impact values and similar heat deflection and flexural modulus values. The latter are unexpected because normal addition of traditional impact modifiers such as styrene-butadiene rubbers or ethylene-propylene rubbers reduces heat deflection and flexural modulus significantly. In the present invention, those values remain unexpectedly high. In particular, the compositions have superior heat deflection properties. All of these improvements are believed to indicate an improved morphological compatibility of the various components of this system, the mechanics of which are not fully understood.

The composition of this invention can also contain various traditional additives in conventional amounts. For example, various fillers and pigments can be added such as talc, calcium carbonate, bentonite, wollastonite, clay, silica, magnesium carbonate, dolomite, glass fibers, carbon black, titanium dioxide and other pigments, and the like. The amounts of said fillers generally range from about 1 to about 40 and desirably from about 1 to about 30 for every 100 parts by weight of the styrene resin. Various antioxidants, blowing agents, light stabilizers, lubricants, processing aids, and the like, well known to the art and to the literature, can also be utilized when desired generally in small amounts as up to about 5 parts by weight for every 100 parts by weight of the polystyrene-based polymer.

The composition of the present invention is prepared in a processing device, such as an extruder, for example, a twin-screw or a single-screw extruder, an intensive mixer, a continuous mixer, a Buss kneader, or the like. As previously discussed, the composition can be compounded in a one step process or a two step process in which a premix is formed. Customarily, the processing device should be operated at a temperature sufficient to melt the styrene resin polymer which naturally will vary with molecular weight. On the other hand, the temperature should not exceed the degradation temperature of any of the components. Usually, temperatures of from about 250° F. to about 500° F. can be utilized, with from about 400° F. to about 450° F. being preferred. The torque parameters of the processing device should be fairly sufficient to masticate the styrene resin and generally has from moderate to high torque. Shear rates vary from 300 to 5,000 sec$^{-1}$, and preferably from 3,000 to 4,500 sec$^{-1}$. Typically, all of the various components forming the flame retardant styrene resin composition of the present invention are added together to the processing device wherein they are mixed and blended to obtain said composition. Alternatively, a master batch of flame retardant and compatibilizing agent and optionally the flame retardant synergist are premixed to give a master batch and a portion of the master batch is then added to the styrene resin (and respectively, if necessary, the flame retardant synergist) to form the composition of this invention.

Generally, for every 100 parts by weight of styrene resin there is employed from about 1 to about 8 parts flame retardant synergist, from about 10 to about 25 parts flame retardant and from about 1 to about 18 parts compatibilizing agent. Preferably, for every 100 parts by weight of styrene resin, there is employed from about 3 to about 7 parts flame retardant synergist, from about 14 to about 22 parts flame retardant and from about 4 to about 15 parts of compatibilizing agent. Most preferably, for every 100 parts by weight of styrene resin, there is employed from about 4 to about 6 parts flame retardant synergist, from about 16 to about 20 parts flame retardant, and from about 6 to about 12 parts of compatibilizing agent.

EXAMPLES

The following tables illustrate the preparation and evaluation of flame retardant compositions of the present invention. Various HIPS resins are utilized in the following tables. The HIPS resins employed are not only from different manufacturers, but also have different styrene-butadiene content. The flame retardant is a brominated polystyrene of either a high molecular weight (Mw≈300,000) identified as Pyro-Chek® 68PB or a low molecular weight (Mw≈3000) identified as Pyro-Chek® LM. Both are available from The Ferro Corporation. The compatibilizing agents are identified in the tables. One such preferred composition is a styrene-butadiene-styrene block copolymer having a weight average molecular weight of ≈85,000 with the name Stereon® 840A, available from The Firestone Tire and Rubber Company.

The compounding of the flame-retardant styrene resin compositions described herein was carried out in a standard counter-rotating twin-screw extruder (34 mm American Leistritz). The starting material was introduced into the extruder in the indicated amounts through a funnel; compounding was continuous with the screws being operated at 100 rpm and the temperature being maintained at or below 460° F. The flame retardant polystyrene resin was extruded through a two-hole die into a water bath, then air-dried and chopped into pellets about ¼" long and 3/16" in diameter. The compositions were also processed where indicated in a Banbury mixer at a temperature of 250°–320° F. and a shear rate of 200 to 5,000.

The pellets were then processed in a Van Dorn injection molder having a 6-ounce shot capacity and a 110-ton clamping capacity. Various configuration specimens were molded to carry-out the tests described in Tables I through IX.

The physical properties described in the following examples are obtained in accordance with ASTM or UL standard test procedures as identified below:

| PROPERTY | TEST PROCEDURE |
| --- | --- |
| Tensile Strength | ASTM D-638 |
| Elongation | ASTM D-638 |
| Flexural Modulus (tangent) | ASTM D-790 |
| Izod Impact (Notched) | ASTM D-256 (Method A) |
| Izod Impact (Unnotched) | ASTM D-256 |
| Gardner Impact | ASTM D-3029 |
| Heat Deflection Temperature | ASTM D-648 |
| Flame Resistance | UL 94 |

TABLE I

EXAMPLE 1: USE OF STEREON 840A TO IMPROVE IMPACT WHILE SUBSTANTIALLY MAINTAINING HDT AND FLEXURAL MODULUS

| | 1 | 2 | 3 | 4 | 5 |
| --- | --- | --- | --- | --- | --- |
| COMPOSITION: | | | | | |
| HIPS RESIN (ASHAI V-0) | 100 | 81 | 79.5 | 76.5 | 73.5 |
| Pyrocheck LM (Ferro) | | 15 | 15 | 15 | 15 |
| Sb$_2$O$_3$ (Thermoguard S, M & T) | | 4 | 4 | 4 | 4 |
| Stereon 840A (Firestone) | | | 1.5 | 4.5 | 7.5 |
| PHYSICAL PROPERTIES: | | | | | |
| Elongation at Break (%) | 101.3 | 31.3 | 42.4 | 55.7 | 69.3 |
| Flexural Modules, Kpsi | 342 | 356 | 348 | 322 | 314 |
| Izod Impact, Notched (ft-lb/in) | 2.5 | 1.5 | 1.6 | 1.8 | 1.9 |
| Izod Impact, Unnotched (ft-lb/in) | 31.9 | 7.8 | 10.1 | 10.4 | 10.0 |
| Gardner Impact (in-lb) | 86.4 | 5.6 | 7.0 | 9.5 | 20.6 |
| Heat Deflection Temp. at 264 psi, C. | 86 | 86 | 81 | 80 | 85 |
| UL-94 ⅛" | Fail | V-0 | V-0 | V-0 | V-0 |
| 1/16" | Fail | V-0 | V-0 | V-0 | V-0 |
| 1/32" | Fail | V-0 | V-0 | V-0 | V-0 |

TABLE II

EXAMPLE 2: USE OF STEREON 840A TO IMPROVE IMPACT WHILE SUBSTANTIALLY MAINTAINING HDT AND FLEXURAL MODULUS

| | 1 | 2 | 3 | 4 | 5 |
| --- | --- | --- | --- | --- | --- |
| COMPOSITION: | | | | | |
| HIPS RESIN (Huntsman 840) | 81 | 79.5 | 78 | 76.5 | 73.5 |
| Pyrocheck LM (Ferro) | 15 | 15 | 15 | 15 | 15 |
| Sb$_2$O$_3$ (Thermoguard S, M & T) | 4 | 4 | 4 | 4 | 4 |
| Stereon 840A (Firestone) | | 1.5 | 3.0 | 4.5 | 7.5 |
| PHYSICAL PROPERTIES: | | | | | |
| Flexural Modulus, Kpsi | 435 | 390 | 392 | 377 | 352 |
| Izod Impact, Notched (ft-lb/in) | 1.7 | 2.1 | 2.1 | 2.3 | 2.8 |
| Izod Impact, Unnotched (ft-lb/in) | 6.9 | 8.4 | 7.6 | 9.8 | 11.3 |
| Gardner Impact (in-lb) | 6.0 | 10.4 | 12.0 | 16.7 | 61.6 |

TABLE II-continued
EXAMPLE 2: USE OF STEREON 840A TO IMPROVE IMPACT WHILE SUBSTANTIALLY MAINTAINING HDT AND FLEXURAL MODULUS

|  | 1 | 2 | 3 | 4 | 5 |
|---|---|---|---|---|---|
| Heat Deflection Temp. at 264 psi, C. | 83 | 84 | 85 | 83 | 81 |
| UL-94 ⅛" | V-0 | V-0 | V-0 | V-0 | V-0 |
| 1/16" | V-0 | V-0 | V-0 | V-0 | V-0 |
| 1/32" | V-0 | V-0 | V-0 | V-0 | V-0 |

TABLE III
EXAMPLE 3: USE OF STEREON 840A TO IMPROVE IMPACT WHILE SUBSTANTIALLY MAINTAINING HDT AND FLEXURAL MODULUS

|  | 1 | 2 | 3 |
|---|---|---|---|
| COMPOSITION: |  |  |  |
| HIPS RESIN (Huntsman 840) | 81 | 77.25 | 73.5 |
| Pyrocheck 68 PB (Ferro) | 15 | 15 | 15 |
| $Sb_2O_3$ (Thermoguard S, M & T) | 4 | 4 | 4 |
| Stereon 840A (Firestone) |  | 3.75 | 7.5 |
| PHYSICAL PROPERTIES: |  |  |  |
| Flexural Modulus, Kpsi | 396 | 391 | 351 |
| Izod Impact, Notched (ft-lb/in) | 0.5 | 0.6 | 0.7 |
| Izod Impact, Unnotched (ft-lb/in) | 3.1 | 3.1 | 4.0 |
| Gardner Impact (in-lb) | 3.4 | 6.6 | 15.2 |
| Heat Deflection Temp. at 264 psi, C. | 81 | 81 | 83 |
| UL-94 ⅛" | V-0 | V-0 | V-0 |
| 1/16" | V-0 | V-0 | V-0 |
| 1/32" | V-0 | V-0 | V-0 |

TABLE IV
EXAMPLE 4: USE OF KRATON D-1101 TO IMPROVE IMPACT OF FILLED SYSTEMS WHILE MAINTAINING HDT

|  | 1 | 2 | 3 | 4 |
|---|---|---|---|---|
| COMPOSITION: |  |  |  |  |
| HIPS RESIN (Dow 475U) | 65.0 | 56.4 |  |  |
| Pyrocheck 68 PB (Ferro) | 16 | 16 | 16 | 16 |
| $Sb_2O_3$ (Thermoguard S, M & T) | 4 | 4 | 4 | 4 |
| Talc (Jet Fill 100, Steetley) | 15 | 15 | 15 | 15 |
| Kraton D-1101 (Shell) |  | 8.6 |  | 8.6 |
| HIPS Resin (Dow 492U) |  |  | 65.0 | 56.4 |
| PHYSICAL PROPERTIES: |  |  |  |  |
| Elongation, Break (%) | 2.8 | 16.2 | 2.9 | 15.3 |
| Flexural Modulus, Kpsi | 581 | 334 | 5.51 | 336 |
| Izod Impact, Notched (ft-lb/in) | 0.2 | 0.8 | 0.2 | 0.8 |
| Izod Impact, Unnotched (ft-lb/in) | 1.4 | 3.5 | 1.4 | 3.4 |
| Gardner Impact (in-lb) | <2 | 12 | <2 | 12 |
| Heat Deflection Temp. at 264 psi, C. | 81 | 79 | 80 | 81 |

TABLE V
EXAMPLE 5: USE OF THREE TYPES OF BLOCK COPOLYMERS TO IMPROVE IMPACT PROPERTIES WHILE MAINTAINING HDT AND MODULUS PROPERTIES

|  | 1 | 2 | 3 |
|---|---|---|---|
| COMPOSITION: |  |  |  |
| HIPS RESIN (Huntsman 840) | 58.5 | 63.5 | 63.5 |
| Talc (Cantal 45-90, Cantal) | 15.0 | 10.0 | 10.0 |
| $Sb_2O_3$ (Thermoguard S, M & T) | 4.0 | 4.0 | 4.0 |
| Pyrocheck 68 PB (Ferro) | 15.0 | 15.0 | 15.0 |
| Kraton D-1101 (Shell) | 7.5 |  |  |
| Stereon 840A (Firestone) |  | 7.5 |  |
| K Resin KR-01 (Phillips) |  |  | 7.5 |
| PHYSICAL PROPERTIES: |  |  |  |
| Elongation, Break (%) | 17.9 | 40.9 | 26.5 |
| Flexural Modulus, Kpsi | 326 | 321 | 386 |
| Izod Impact, Notched (ft-lb/in) | 1.2 | 1.4 | 0.7 |
| Izod Impact, Unnotched (ft-lb/in) | 3.2 | 4.3 | 2.6 |

TABLE V-continued
EXAMPLE 5: USE OF THREE TYPES OF BLOCK COPOLYMERS TO IMPROVE IMPACT PROPERTIES WHILE MAINTAINING HDT AND MODULUS PROPERTIES

|  | 1 | 2 | 3 |
|---|---|---|---|
| Gardner Impact (in-lb) | 10 | 15 | 5 |
| Heat Deflection Temp. at 264 psi, C. | 84 | 82 | 82 |
| UL-94 1/16" | V-0 | V-0 | V-1 |
| 1/32" | V-0 | V-0 | V-0 |

TABLE VI
EXAMPLE 6: USE OF INEXPENSIVE FILLER (TALC) WHILE MAINTAINING KEY PHYSICAL PROPERTIES OF FLAME RETARDANT HIPS COMPOSITIONS CONTAINING BLOCK COPOLYMER

|  | 1 | 2 | 3 | 4 |
|---|---|---|---|---|
| COMPOSITION: |  |  |  |  |
| HIPS RESIN (Huntsman 840) | 73.5 | 73.5 | 63.5 | 63.5 |
| Pyrocheck LM (Ferro) | 15.0 | 15.0 | 15.0 | 15.0 |
| $Sb_2O_3$ (Thermoguard S, M & T) | 4.0 | 4.0 | 4.0 | 4.0 |
| Stereon 840A (Firestone) |  | 7.5 | 7.5 | 7.5 |
| Talc (Cantal 45-90 Cantal) |  |  | 10.0 |  |
| Talc (Select-A-Sorb, R.T. Vanderbilt) |  |  |  | 10.0 |
| PHYSICAL PROPERTIES: |  |  |  |  |
| Elongation, Break (%) | 22.0 | 34.0 | 28 | 27 |
| Flexural Modulus, Kpsi | 431 | 295 | 308 | 296 |
| Izod Impact, Notched (ft-lb/in) | 0.5 | 1.9 | 1.4 | 1.2 |
| Izod Impact, Unnotched (ft-lb/in) | 2.2 | 5.8 | 4.8 | 4.5 |
| Gardner Impact (in-lb) | 3 | 16 | 15 | 14 |
| Heat Deflection Temp. at 264 psi, C. | 90 | 88 | 87 | 87 |
| UL-94 1/32" | V-0 | V-0 | V-0 | V-0 |

TABLE VII
EXAMPLE 7: EFFECT OF PROCESSING ON IMPACT PROPERTIES OF FLAME RETARDANT HIPS COMPOSITIONS (T.S. = Twin Screw Extruder & B.M. = Banbury Mixer)

|  | B.M. | T.S. | B.M. | T.S. |
|---|---|---|---|---|
| COMPOSITION: |  |  |  |  |
| HIPS RESIN (Huntsman 840) | 81.0 | 81.0 | 73.5 | 73.5 |
| Pyrocheck 68 PB (Ferro) | 15.0 | 15.0 | 15.0 | 15.0 |
| $Sb_2O_3$ (Thermoguard S, M & T) | 4.0 | 4.0 | 4.0 | 4.0 |
| Stereon 840A (Firestone) |  |  | 7.5 | 7.5 |
| PHYSICAL PROPERTIES: |  |  |  |  |
| Elongation, Break (%) | 3.8 | 34.0 | 17.4 | 34 |
| Flexural Modulus, Kpsi | 350 | 340 | 351 | 295 |
| Izod Impact, Notched (ft-lb/in) | 0.6 | 1.0 | 0.7 | 1.9 |
| Izod Impact, Unnotched (ft-lb/in) | 2.4 | 4.4 | 4.0 | 5.8 |
| Gardner Impact (in-lb) | 4.2 | 6.3 | 15.2 | 16 |
| Heat Deflection Temp. at 254 psi, C. | 87 | 85 | 84 | 88 |
| UL-94 1/32" | V-0 | V-0 | V-0 | V-0 |

TABLE VIII
EXAMPLE 8: EFFECT OF BLOCK COPOLYMER IN FLAME RETARDANT HIPS COMPOSITIONS (PYROCHECK 68 PB VS. LM)

|  | 1 | 2 |
|---|---|---|
| COMPOSITION: |  |  |
| HIPS RESIN (Huntsman 840) | 81.0 | 81.0 |
| $Sb_2O_3$ (Thermoguard S, M & T) | 4.0 | 4.0 |
| Stereon 840A (Firestone) | 7.5 | 7.5 |
| Pyrochek 68 PB (Ferro) | 15.0 |  |
| Pyrocheck LM (Ferro) |  | 15.0 |
| PHYSICAL PROPERTIES: |  |  |
| Tensile Strength | 3557 | 3824 |

TABLE VIII-continued

EXAMPLE 8: EFFECT OF BLOCK COPOLYMER IN
FLAME RETARDANT HIPS COMPOSITIONS
(PYROCHECK 68 PB VS. LM)

|  | 1 | 2 |
|---|---|---|
| Flexural Modulus, Kpsi | 351 | 352 |
| Izod Impact, Notched (ft-lb/in) | 0.7 | 2.8 |
| Izod Impact, Unnotched (ft-lb/in) | 4.0 | 11.3 |
| Gardner Impact (in-lb) | 15.2 | 61.6 |
| Heat Deflection Temp. at 264 psi, C. | 84 | 85 |
| UL-94 1/32" | V-0 | V-0 |

TABLE IX

EXAMPLE 9: EFFECT OF MISCELLANEOUS COMPATIBILIZERS
IN FLAME RETARDANT HIPS COMPOSITIONS
(*Pre-mixed together in a Banbury Mixer).

|  | 1 | 2 | 3 | 4 | 5 | 6 |
|---|---|---|---|---|---|---|
| COMPOSITION: |  |  |  |  |  |  |
| HIPS RESIN (Huntsman 840) | 81.0 | 76.0 | 76.0 | 76.0 | 76.0 | 76.0 |
| Pyrocheck 68 PB (Ferro) | 15.0 | 15.2* | 15.2* | 15.2* | 15.2* | 15.2* |
| Sb$_2$O$_3$ (Thermoguard S, M & T) | 4.0 | 4.0 | 4.0 | 4.0 | 4.0 | 4.0 |
| Kraton G-1651 (Shell) |  | 4.8* | 3.6* |  |  |  |
| Kraton G-1901 F (Shell) |  |  | 1.2* | 4.8* |  |  |
| KR-03 (Phillips) |  |  |  |  | 4.8* | 4.8* |
| CR-10 Peroxide concentrate, Polyvel |  |  |  |  |  | 0.05 |
| PHYSICAL PROPERTIES: |  |  |  |  |  |  |
| Flexural Modulus, Kpsi | 350 | 310 | 320 | 330 | 350 | 320 |
| Izod Impact, Notched (ft-lb/in) | 1.1 | 1.7 | 1.6 | 1.5 | — | 1.2 |
| Izod Impact, Unnotched (ft-lb/in) | 3.1 | 6.0 | 5.7 | 5.7 | 2.9 | 5.0 |
| Gardner Impact (in-lb) | 6.0 | 15.0 | 17 | 18.0 | 5.0 | 16.0 |
| Heat Deflection Temp. at 264 psi, C. | 76 | 75 | 75 | 76.5 | 76 | 76 |
| UL-94 ⅛" | V-0 | V-0 | V-0 | V-0 | — | V-0 |
| 1/16" | V-0 | V-0 | V-0 | V-0 | V-0 | V-2 |
| 1/32" | V-0 | V-0 | V-0 | V-0 | V-0 | V-2 |

Table I illustrates a significant improvement in elongation and impact values with the addition of the compatibilizing agent while maintaining heat deflection temperatures and flexural modulus and, of course, achieving the desired flame retardancy through the use of a low molecular weight brominated polystyrene.

Table II illustrates a similar effect with a different high impact polystyrene resin and also through the use of the low molecular weight brominated polystyrene.

Table III illustrates the effect with the same resin used in Table II, but with the high molecular weight brominated polystyrene flame retardant.

Table IV illustrates two additional resins and an additional compatibilizing agent. These samples further illustrate similar performance characteristics even in the presence of filler.

Table V shows three separate block copolymers as compatibilizing agents used in comparable resin systems. This data illustrates that Stereon ®840A is a preferred compatibilizing agent to improve impact properties.

In Table VI, the use of Stereon 840A is illustrated as improving impact properties and maintaining heat deflection, even in the presence of fillers, such as talc.

Table VII illustrates the effect of processing equipment on the present invention showing the improvements in impact properties for systems blended in both Banbury mixers and twin screw extruders. It is noted that the data set forth in this Table was collected from four different studies designed to show the significance of processing conditions on the present invention.

Table VIII illustrates the use of two different flame retardants in the same resin system.

Table IX illustrates the effect of various compatibilizing agents used in a pre-mix with the flame retardant. It also illustrates the use of a peroxide to further improve impact properties.

While in accordance with the Patent Statutes, the best mode and preferred embodiment has been set forth, the scope of the invention is not limited thereto, but rather by the scope of the attached claims.

What is claimed is:

1. A flame retardant composition comprising:
   about 10 to about 25 parts by weight of a flame retardant comprising brominated polystyrene;
   about 1 to about 8 parts by weight of one or more of antimony oxide and sodium antimonate;
   about 2 to about 18 parts by weight of a compatibilizing agent comprising a styrene-butadiene copolymer having from about 40 to about 60 percent styrene; and
   about 100 parts by weight of a styrene polymer selected from the group consisting of high impact polystyrene, polystyrene, poly-α-methylstyene, polyvinylnaphthalene, styrene-acrylonitrile copolymer, styrene maleic anhydride copolymer, EPDM modified styrene acrylonitrile copolymer, acrylic-styrene-acrylic copolymer and acrylonitrile-butadiene-sytrene copolymer.

2. The composition as set forth in claim 1, wherein said styrene polymer is a high impact polystyrene.

3. The composition of claim 2, wherein said flame retardant is low molecular weight brominated polystyrene.

4. The composition of claim 1, wherein said compatibilizing agent is a multi-block copolymer.

5. A flame retardant composition as set forth in claim 4, further including a filler.

6. A flame retardant composition as set forth in claim 4, further comprising a peroxide.

7. A flame retardant composition as set forth in claim 6, wherein a premix is made comprising said flame retardant and said compatibilizing agent.

8. A flame retardant composition as set forth in claim 1, wherein the notched Izod impact strength of the composition is within at least minus 20 percent of the comparable value of a comparable composition without said flame retardant package.

9. A flame retardant package for use in a sytrene resin comprising from about 14 to about 22 parts of a brominated polystyrene flame retardant, from about 1 to about 8 parts of antimony oxide, or sodium antimonate, and from about 1 to about 18 parts of a block copolymer of butadiene sytrene having from about 40 to about 60 percent butadiene and from about 40 to about 60 percent styrene.

10. A process for the production of a flame retardant composition comprising blending together a styrene resin with a flame retardant package, said flame retardant package comprising from about 52 to about 88 parts of a polymeric or oligomeric flame retardant, from about 6 to about 17 parts of a flame retardant synergist, and from about 6 to about 31 parts of a compatibilizing agent.

11. A process as set forth in claim 10, wherein said composition is blended at a shear of from about 2,000 to about 5,000 sec$^{-1}$, and a temperature of from about 250° F. to about 500° F.

12. A process as set forth in claim 11, wherein a premix comprises at least said flame retardant and said compatibilizing agent.

13. A flame retardant composition comprising:
about 10 to 25 parts by weight of a flame retardant comprising brominated polystrene;
about 1 to about 8 parts by weight of one or more of antimony oxide and sodium antimonate;
about 2 to about 18 parts by weight of a compatibilizing agent comprising about 2 to about 18 parts by weight of a styrene-butadiene multiblock copolymer; and
about 100 parts by weight of a styrene polymer selected from the group consisting of high impact polystyrene, polystyrene, poly-α-methylstyrene, polyvinyl naphthalene, styrene-acrylonitrile copolymer, styrene maleic anhydride copolymer, EPDM modified styrene acrylonitrile copolymer, acrylic-styrene-acrylic copolymer and acrylonitrile-butadiene-styrene copolymer.

* * * * *